E. F. HOCKENBERRY.
LOCK NUT.
APPLICATION FILED MAR. 12, 1915.
1,190,409. Patented July 11, 1916.
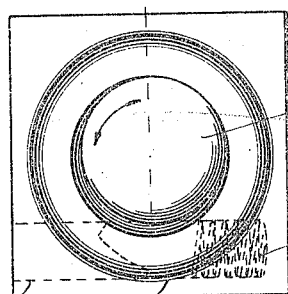
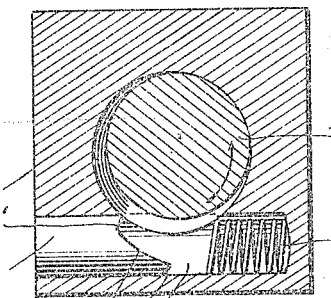
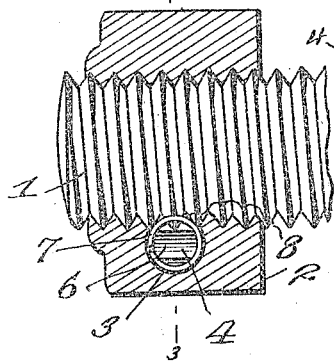
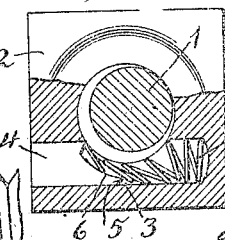
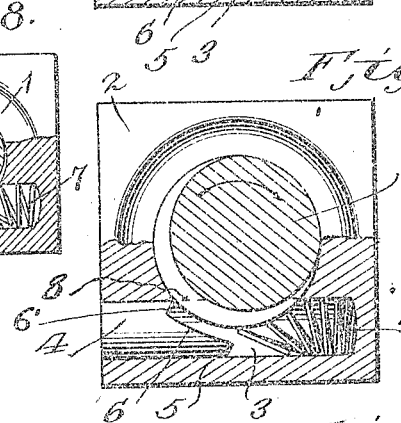
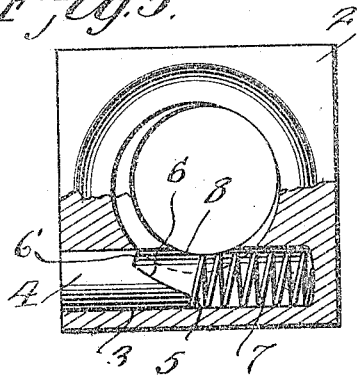
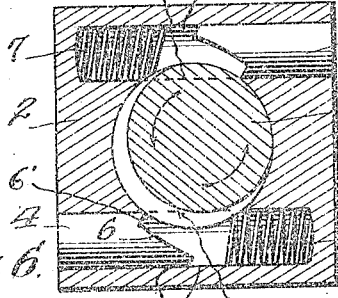
Inventor
Ernest F. Hockenberry,
By Victor J. Evans
Attorney
Witnesses
Frank Hough

UNITED STATES PATENT OFFICE.

ERNEST F. HOCKENBERRY, OF SLIPPERY ROCK, PENNSYLVANIA.

LOCK-NUT.

1,190,409.  Specification of Letters Patent.  Patented July 11, 1916.

Application filed March 12, 1915. Serial No. 13,896.

*To all whom it may concern:*

Be it known that I, ERNEST F. HOCKENBERRY, a citizen of the United States, residing at Slippery Rock, in the county of Butler and State of Pennsylvania, have invented new and useful Improvements in Lock-Nuts, of which the following is a specification.

The present invention relates to improvements in means for securing a nut upon a bolt in such a manner as to prevent the accidental separation thereof.

In carrying out my invention it is my purpose to provide a simple, cheap, and thoroughly effective means whereby a nut may be readily screwed upon a bolt in a homeward direction but which will be retarded and prevented from moving in an unscrewing or retrograde direction.

I also aim to provide a nut adapted to engage with an ordinary bolt, the said nut being provided with a locking element in the nature of a helical spring and which is at all times contacted by the threads of the bolt, so that when the nut or bolt is screwed in one direction the spring will be compressed to permit of the free rotation or screwing of the nut upon the bolt, but when the said nut or bolt is rotated in an opposite direction the spring will expand so that each of its coils or convolutions will contact with the threads of the bolt, thus providing a plurality of engaging members which will insure the locking of the nut with the bolt.

With the above and other objects in view, the improvement resides in the construction, combination and arrangement of parts set forth in the following specification and falling within the scope of the appended claim.

In the drawing there is illustrated a simple and satisfactory reduction of the improvement to practice, it being understood that the nature of the invention is such as to permit of modifications as to size, proportion, etc., all of which, however, fall within the scope of my claim.

In the drawing: Figure 1 is a face view of a lock nut constructed in accordance with my invention and showing the same arranged upon a bolt, Fig. 2 is a longitudinal sectional view approximately on the line 2—2 of Fig. 1, Fig. 3 is a transverse sectional view approximately on the line 3—3 of Fig. 2, Fig. 4 is a sectional view, similar to Fig. 3, but illustrating the arrangement of the locking element when the nut is screwed home upon the bolt, or when an attempt is made to remove the nut from the bolt, Fig. 5 is a face or plan view, parts being in section, illustrating the end coil or convolution of the spring locking member engaged by the end or shoulder of the plug which closes the passage within which the spring is received, Fig. 6 is a perspective view of the plug, Fig. 7 is a sectional view illustrating the employment of a plurality of locking members, Fig. 8 is a sectional view similar to Figs. 3, 4 and 5 and showing the arrangement of the spring when certain of the convolutions thereof are forced against the angular wall 6 of the plug to exert a tension between the threads of the bolt and the said wall to lock the nut upon the bolt.

Referring now to the drawing in detail, in which like reference characters indicate corresponding parts throughout, the numeral 1 designates a bolt of any ordinary construction, and 2 a nut, also of any ordinary construction, which is threaded upon the bolt 1.

The nut 2 is provided with a longitudinally extending passage 3 which enters from one of its sides and which is normally closed through the medium of a plug 4. The inner end of the plug provides a shoulder or stop member 5, from which the face of the plug is continued angularly, as at 6, and the angular portion is disposed directly below an opening providing a communication between the passage 3 and the bore of the nut 2. The passage 3, beyond the terminal of the plug 4 provides for the reception of a locking element in the nature of a helical spring 7. The spring naturally exerts a tension in an outward direction, so that a portion thereof is projected within the opening 8 that communicates between the bore of the nut and the passage 3, and as a consequence the threads of the bolt at all times contact with the end convolutions of the spring 7. When the nut is rotated upon the bolt in a homeward direction the contact of the threads thereof with the spring will compress the said spring to permit of the free screwing of the nut upon the bolt, and it will be apparent that when the nut is screwed in such direction no injury to the threads thereof can be inflicted by the spring. It will also be apparent that should an attempt be made at unscrewing the nut from the bolt the frictional contact of the spring with the threads of the bolt will cause the said spring to expand, as illustrated in Figs. 4 and 8, and as a consequence effectively prevent the separation of the nut from the bolt.

While the contacting engagement of the convolutions or coils of the spring member 7 is such as to effectively prevent the accidental separation of the nut from the bolt, due to vibration or other causes, it will be apparent that by the employment of force, such as wrenches, upon the head of the bolt and upon the nut, the said members may be separated. It will also be apparent that should the separation inflict an injury upon any of the coils or convolutions of the spring the same spring may be again employed by simply reversing the same; that is, by positioning the injured end of the spring within the pocket provided by the passage 3 therefor. It will be further noted that the plug 4 effectively sustains the spring within its pocket and provides a closure for the passage 3, so that the spring locking member 7 will not be exposed to the elements and injury thereby cannot be inflicted upon the said spring. It will be further noted that should it be desired to remove the spring without removing the plug 4 a suitable instrument, such as a pincers or the like, may be passed longitudinally within the bore of the nut and engage with the end coil or convolution of the spring and direct the same through the opening 8. The spring 7, before the bolt is screwed through the nut, will have one of its ends contact with the shouldered end 5 of the plug 4, as shown in Fig. 5 and when the said bolt is screwed upon the nut the spring will be contracted and forced between the threads of the nut and the inner wall of the channel or passage 3 as shown in Fig. 3. When the bolt is rotated in an unscrewing direction, the threads of the same contacting with the convolutions of the spring will direct the same upon the angular surface 6 of the plug 4, the first step in this direction being illustrated in Fig. 4. As the nut or bolt is further rotated in an unscrewing direction, the end convolutions of the spring will be entirely forced upon the angular wall 6 above and into contact with the inner shoulder 6', which action will spread the convolutions of the spring to bring the same into tight frictional engagement between the angular wall 6 of the threads of the bolt and lock the nut upon the bolt.

Having thus described the invention, what I claim is:

In a lock nut, the combination of a bolt and a nut therefor, said nut having a longitudinal passage which communicates with its bore, a plug closing the open end of the passage, said plug having its face disposed opposite the opening between the bore of the nut and the passage therein formed with an angular surface that terminates in a shoulder, a helical spring in the passage normally engaging between the inner wall of the passage and the inner end of the plug, said spring adapted when the nut or bolt is rotated in an unscrewing direction to have certain of its convolutions spread and forced upon the angular surface of the plug and toward the shoulder of the plug to frictionally engage between the said angular wall and the threads of the bolt to lock the nut upon the bolt.

In testimony whereof I affix my signature in presence of two witnesses.

ERNEST F. HOCKENBERRY.

Witnesses:
GROVER C. WATSON,
A. L. WATSON.